United States Patent
Gaye et al.

(10) Patent No.: US 9,863,490 B2
(45) Date of Patent: Jan. 9, 2018

(54) MOTOR VEHICLE DISC BRAKE HAVING REDUCED TRANSVERSE CLEARANCE BETWEEN PINS AND BORES

(71) Applicant: CHASSIS BRAKES INTERNATIONAL B.V., Amsterdam (NL)

(72) Inventors: Andre Gaye, Dalian (CN); Sandra Merrien, Paris (FR)

(73) Assignee: CHASSIS BRAKES INTERNATIONAL B.V., Eindhoven (NL)

( * ) Notice: Subject to any disclaimer, the term of this patent is extended or adjusted under 35 U.S.C. 154(b) by 0 days.

(21) Appl. No.: 15/036,828

(22) PCT Filed: Nov. 5, 2014

(86) PCT No.: PCT/EP2014/073770
§ 371 (c)(1),
(2) Date: May 16, 2016

(87) PCT Pub. No.: WO2015/071142
PCT Pub. Date: May 21, 2015

(65) Prior Publication Data
US 2016/0290420 A1  Oct. 6, 2016

(30) Foreign Application Priority Data
Nov. 18, 2013  (FR) ..................................... 13 61276

(51) Int. Cl.
*F16D 55/2265* (2006.01)
*F16D 55/227* (2006.01)
(Continued)

(52) U.S. Cl.
CPC ..... *F16D 55/22655* (2013.01); *F16D 55/227* (2013.01); *F16D 65/0006* (2013.01); *F16D 65/0087* (2013.01); *F16D 2055/0041* (2013.01)

(58) Field of Classification Search
CPC ............. F16D 55/22655; F16D 55/227; F16D 65/0087; F16D 65/0006; F16D 2055/0041
(Continued)

(56) References Cited

U.S. PATENT DOCUMENTS 4,049,086 A * 9/1977 Rath ................. F16D 55/22655
188/73.36
4,401,194 A * 8/1983 Klassen ............ F16D 55/22655
188/73.44
(Continued)

FOREIGN PATENT DOCUMENTS

CN   202 349 032 U   7/2012
CN   103 062 262 A   4/2013
(Continued)

OTHER PUBLICATIONS

International Search Report, dated Aug. 7, 2015, from corresponding PCT application.
(Continued)

*Primary Examiner* — Thomas J Williams
*Assistant Examiner* — Mariano Sy
(74) *Attorney, Agent, or Firm* — Young & Thompson

(57) ABSTRACT

A motor vehicle disc brake includes a cover with two tiered bores of parallel axes, each bore includes at least one first section; a caliper slidably mounted axially with respect to the cover by two pins of parallel axes rigidly connected to the caliper and each including at least one guiding section which is slidably mounted, with a radial clearance, in the tiered bore of the cover; and brake, wherein a cylindrical outer guiding surface of the sliding guiding section of each
(Continued)

pin includes at least two opposed axial portions, extending angularly about the axis of each pin according to an angle less than 90°, a median axial plane of the two portions being parallel with a plane passing through the axes of the two pins.

12 Claims, 3 Drawing Sheets

(51) Int. Cl.
 *F16D 65/00* (2006.01)
 *F16D 55/00* (2006.01)

(58) Field of Classification Search
 USPC .............................. 188/73.45, 73.44, 73.43
 See application file for complete search history.

(56) References Cited

U.S. PATENT DOCUMENTS

| | | | | |
|---|---|---|---|---|
| 4,427,096 A | * | 1/1984 | Stoka | F16D 55/227 188/73.34 |
| 4,741,419 A | * | 5/1988 | Rath | F16D 55/227 188/72.3 |
| 5,526,904 A | * | 6/1996 | Walden | F16D 55/227 188/73.44 |
| 8,051,958 B1 | * | 11/2011 | Rockwell | F16D 55/22655 188/73.45 |
| 8,905,201 B2 | * | 12/2014 | Laubenthal | F16D 55/22655 188/72.6 |
| 2014/0116817 A1 | * | 5/2014 | Morais | F16D 55/227 188/73.45 |
| 2014/0262636 A1 | * | 9/2014 | Gerber | F16D 55/22655 188/73.44 |
| 2016/0273596 A1 | * | 9/2016 | Gaye | F16D 55/227 |

FOREIGN PATENT DOCUMENTS

| | | |
|---|---|---|
| CN | 203 082 090 U | 7/2013 |
| DE | 20 2006 006142 U1 | 7/2006 |
| GB | 1 271 609 A | 4/1972 |

OTHER PUBLICATIONS

FR Search Report, dated Aug. 4, 2014, from corresponding FR application.

* cited by examiner

MOTOR VEHICLE DISC BRAKE HAVING REDUCED TRANSVERSE CLEARANCE BETWEEN PINS AND BORES

TECHNICAL FIELD OF THE INVENTION

The invention relates to a motor vehicle disc brake.

TECHNICAL BACKGROUND OF THE INVENTION

The invention relates more particularly to a motor vehicle disc brake including:
- a cover including two tiered bores of parallel axes, each whereof includes at least one first section;
- a caliper slidably mounted axially with respect to the cover;
- two pins of parallel axes, each whereof includes an axial attachment end attached to the caliper and at least one guiding section for axial sliding of the caliper with respect of the cover which is slidably mounted, with a radial clearance, in the first section of the associated tiered bore of the cover.

This particularly widespread design has drawbacks.

In a conventional disc brake, to enable the sliding of the pins in the first sections of the bores, a radial functional clearance is present between said pins and said associated first sections. This clearance is not geometrically spatially oriented, particularly in relation to the plane passing through the axes of the two pins.

During braking, friction linings applied to a disc in rotation are driven by the disc and in turn drive the caliper bearing the pins. This results in a shock between said pins and the associated reception and sliding guiding bores thereof which are formed in the cover. Uncontrolled clearance between these bores of the cover and the pins causes a braking noise when establishing the tangential bearing of the pins in the respective bores thereof.

BRIEF SUMMARY OF THE INVENTION

In order to remedy this drawback, the invention proposes a motor vehicle disc brake including means for limiting the above-mentioned noise.

In this aim, the invention relates to a disc brake of the type described above, characterised in that the cylindrical outer guiding surface of said sliding guiding section of each pin includes at least two opposed axial portions, each whereof extends angularly about the axis of each pin according to an angle less than 90°, and in that a median axial plane of these two portions is parallel with a plane passing through the axes of the two pins.

According to further features of the invention:
- the two portions are diametrically opposed,
- the radial clearance, in said plane passing through the axes of the two pins, of each guiding section in the first section of the associated tiered bore is equal to a common mean value;
- each guiding section of each pin includes at least two further opposed axial portions of the cylindrical outer surface of said section;
- each said portion is defined by a pair of flat sections of axial orientation;
- each axial portion extends along the same axial length;
- each guiding section extends from a free end of the associated pin;
- at least one flat section of each pin extends from the free end of the pin along a length greater than that of the guiding section;
- the two pins are identical;
- each associated tiered bore of the cover includes, on the side of the end for attaching the pin to the caliper, a second entry section, and each pin receives a tubular sealing cap wherein one section is inserted radially between the associated pin and said second entry section.

BRIEF SUMMARY OF THE FIGURES

Further features and advantages of the invention will emerge on reading the detailed description hereinafter for the comprehension whereof, reference will be made to the appended figures wherein.

DETAILED DESCRIPTION OF THE FIGURES

In the description and claims hereinafter, expressions such as "longitudinal orientation", "transversal", etc. will be used in a non-restrictive manner with reference to the dihedron (L, T) represented in the figures and the definitions given in the description.

In the description hereinafter, identical reference numbers denote identical or equivalent parts or parts having similar functions.

Figure 1:
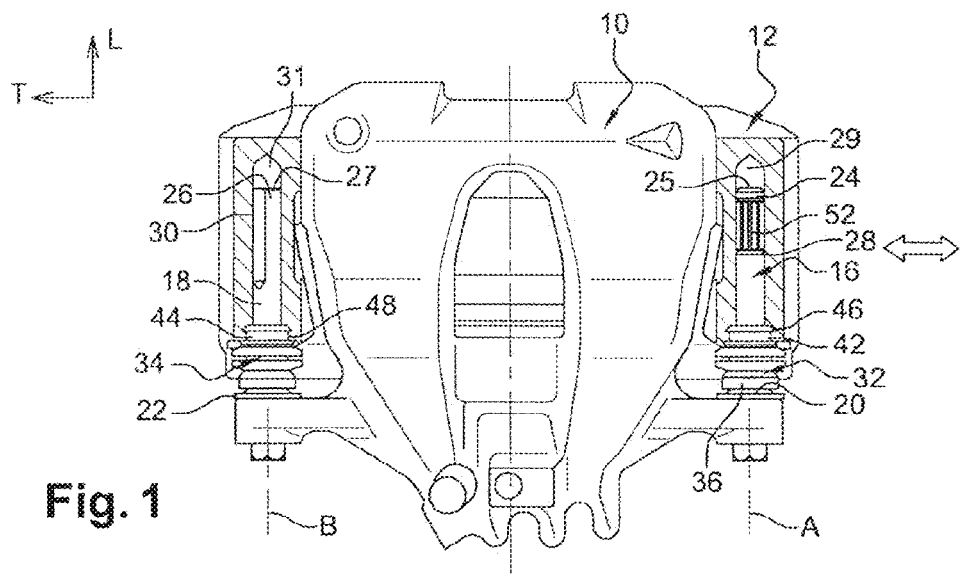
FIG. 1 is a top view, with partial cutaways, of a caliper and a cover of a disc brake according to the prior art, particularly illustrating the transverse movement capabilities of each pin of the caliper in the associated tiered bore of the cover of a disc brake.
Figure 3:
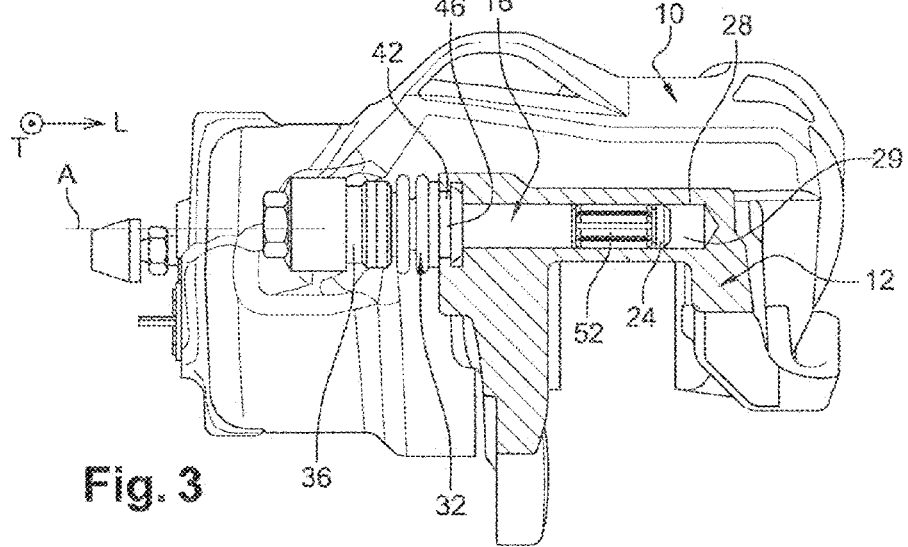
FIG. 3 is a side view, with partial cutaway, representing a caliper and a cover of a disc brake according to the prior art.

FIGS. 1 and 3 represent a caliper 10 and a cover 12 of a motor vehicle disc brake (not shown) embodied according to the prior art.

In a known manner, the disc brake includes a fixed cover 12 including two tiered bores 29, 31 of parallel axes A, B, each whereof includes at least one first blind section 28, 30.

The brake also includes a caliper 10 which is axially slidably mounted, along a longitudinal direction parallel with the axes A and B, with respect to the fixed cover 12.

The caliper 10 is slidably mounted with respect to the cover 12 by means of two parallel pins 16, 18 of axes A, B, each whereof includes a first axial end 20, 22 which is attached to the caliper 10, and includes at least one section 24, 26 for guiding the axial sliding of the caliper 10 with respect to the cover 12 which is slidably mounted, with a radial clearance, in the first section 28, 30 of the associated tiered bore 29, 31 of the cover 12.

During braking, the caliper tightens the disc via the brake pads and the hydraulic pistons actuating on the pads. The whole "follows" the direction of rotation of the disc in an axis parallel with the plane A-B until pin/bore contact is established.

As illustrated in FIGS. 1 and 3, a solution known from the prior art for limiting these run-outs consists of radially inserting a cap 32, 34 made of elastomeric material, which is received on each pin 16, 18 between the pin 16, 18 and a second so-called "entry" section 46, 48 of the tiered bore 29, 31 facing the caliper 10.

Figure 4:
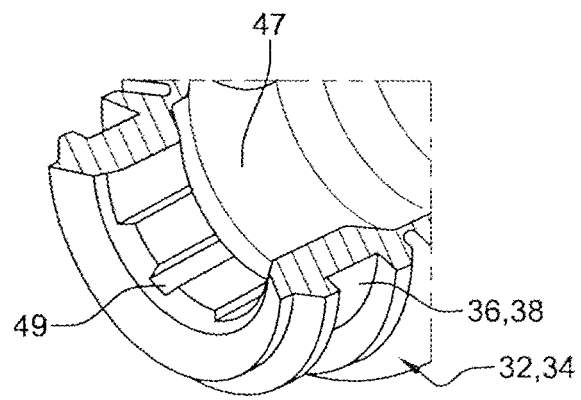
FIG. 4 is a detailed view illustrating the internal axial bore of a sealing cap of a disc brake according to the prior art.

As illustrated in FIG. 4, each cap 32, 34 can also ensure the tightness of the tiered bores 29, 31 to dust. To enable the "decompression" or evacuation of the air contained in the tiered bores 29, 31, each cap 32, 34 includes axial striations or channels 49 formed in the wall of an inner bore 47 of the cap. The striations 49 make it possible to evacuate the air which is compressed in the blind axial base of the corresponding tiered bore 29, 31 due to the axial progression of the pins 16, 18 in the associated bores 29, 31 when the caliper 10 is moved with respect to the cover 12, as the brake linings become worn and during a braking actuation.

Figure 2:
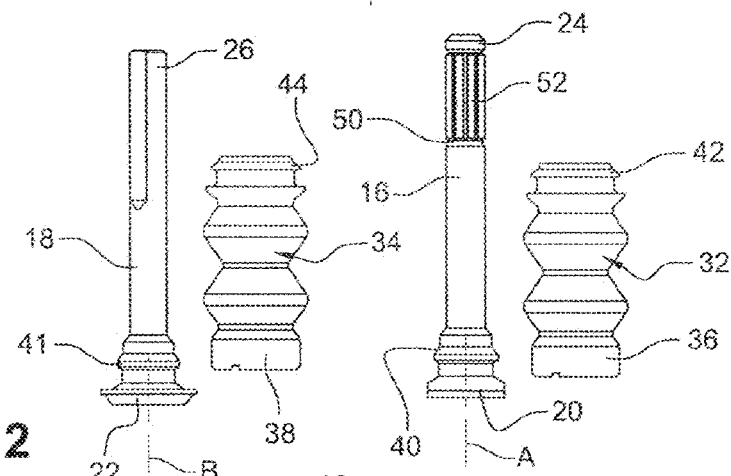
FIG. 2 is a detailed view of the two pins and the two associated sealing caps of the disc brake in FIG. 1 according to the prior art.

Furthermore, as illustrated in FIGS. 1 and 2, the brake has a design and a non-symmetrical assembly wherein one of the pins, for example in this case the pin 16, receives on an intermediate part 50 of the first guiding section 24 thereof, a sleeve 52 made of elastomeric material or "bushing" which, in the assembled position of the caliper and the cover, is housed in the first section 28 of the tiered bore 29.

It is thus important to propose a disc brake with more effective means for limiting the transverse movement of the pins 16, 18 so as to limit parasitic noise.

The aim of the disc brake according to the invention is that of reducing this clearance along the transverse direction T.

According to the invention, the cylindrical outer guiding surface of the guiding section 24, 26 of each pin 16, 18 is no longer a continuous convex cylindrical surface extending angularly over the entire circumference. The cylindrical outer guiding surface of the guiding section 24, 26 of each pin 16, 18 includes at least two opposed axial portions 64, each whereof extends angularly about the axis A, B of each pin 16, 18 according to an angle "a" less than ninety degrees, and a median axial plane "M" of these two portions 64 is parallel with a plane "P" passing through the axes A, B of the two pins 16, 18.

Figure 9:
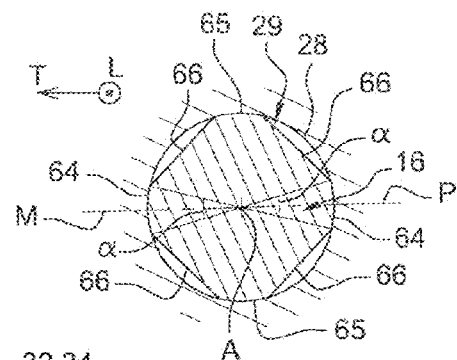
FIG. 9 is a sectional view through a transverse plane of a first section of a pin received in a first section of the tiered bore of a cover of the disc brake according to the invention.

This embodiment and this geometric arrangement are represented in a sectional view for the pin 16 and the tiered bore 29 in FIG. 9.

In one preferred embodiment of the invention, the axial portions 64 are diametrically opposed. In this case, the plane M is merged with the plane P passing through the axes A, B of the two pins 16, 18.

This embodiment is however not restrictive of the invention, and the plane M may, alternatively, be offset with respect to the plane "P" while being parallel thereto, the axial portions 64 then also being offset.

A further feature of the invention is that the radial clearance, in said plane M parallel with the plane P is equal to a common mean value.

In the case represented in FIG. 9, the radial clearance, the plane P passing through the axes A, B is thus also equal to a common mean value.

For example, for a medium-sized motor vehicle brake including pins wherein the diameter is preferably between 8 and 14 mm, advantageously equal to 10 mm, the common mean value of the radial clearance is equal to 195 μm.

This embodiment thus advantageously makes it possible to distribute the clearances equally in the two bores 29, 31.

To ensure the spatial orientation of the axial portions 64, the brake includes indexing means 58, 59 of the angular position of each pin 16, 18 about the axis A, B thereof with respect to the caliper 10 to which it is attached.

Figure 5:
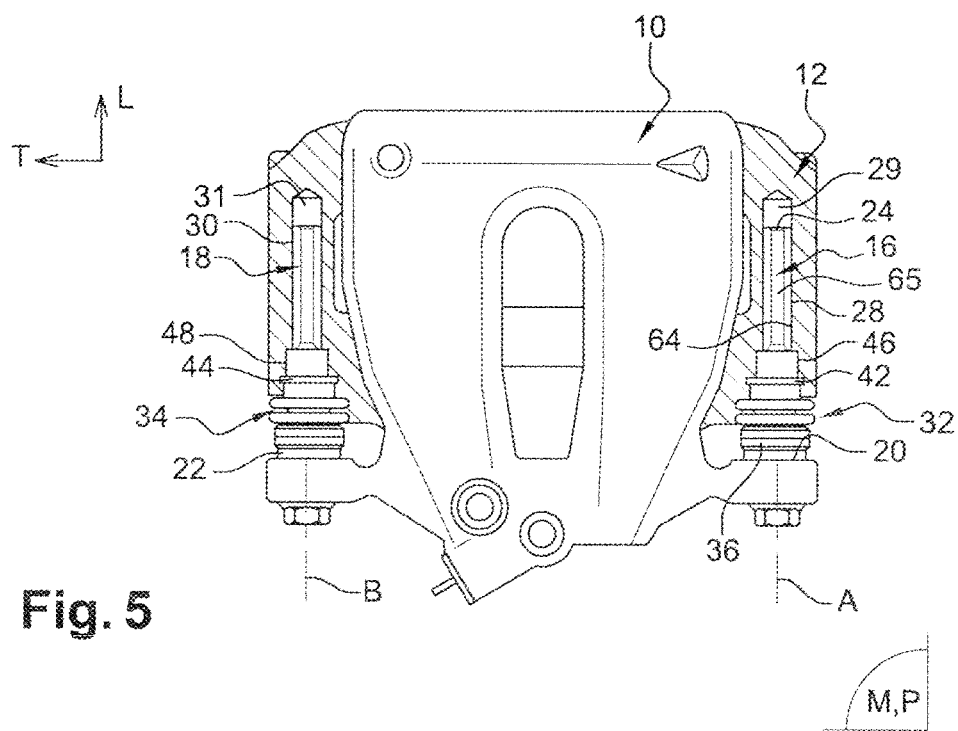
FIG. 5 is a top view, similar to that in FIG. 1, representing a caliper and a cover of a disc brake according to the invention.
Figure 7:
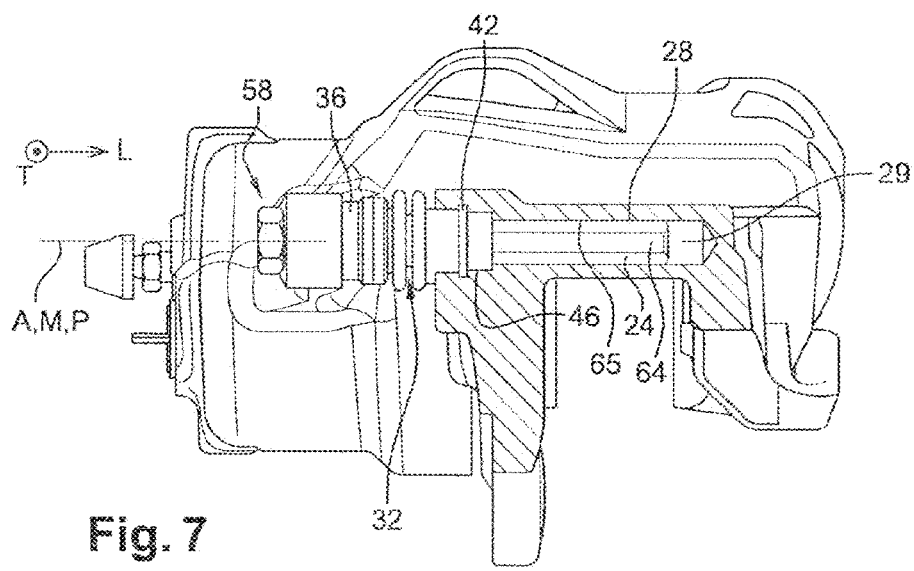
FIG. 7 is a similar view to that in FIG. 3 representing a caliper and a cover of a disc brake according to the invention.

For this purpose, as represented in a manner not restricting the invention in FIGS. 5 and 7, the end 20, 22 for attaching each pin 16, 18 to the caliper 10 is received in an axial reception hole (not shown) formed in the caliper 10 and said end 20, 22 of the pin 16, 18 in question includes at least one section 58, 59 for attaching the pin which is shaped in a circular non-cylindrical cavity complementary with the cavity formed in said axial reception hole.

For example, each non-cylindrical section 58, 59 may include a cavity obtained from a circular cylindrical section whereon two flat sections are formed and the complementary hole (not shown) of the caliper 10 includes for this purpose two complementary flat sections.

This embodiment makes it possible to form the indexing means of the angular position of each pin 16, 18 and block the rotation thereof about the axis A, B thereof, and thus ensure the sought orientation of the axial portions 64 with respect to the caliper, and subsequently with respect to the cover in the assembled position of the caliper on the cover.

In this way, the run-out possibilities of each pin 16, 18 along the transverse direction T in the first section 28, 30 of the associated tiered bore 29, 31 are reduced.

In one preferred embodiment of the invention, each guiding section 24, 26 of each pin 16, 18 includes two further opposed axial portions 65 of the cylindrical outer guiding surface of the section 24, 26.

These two further opposed axial portions 65 of the cylindrical outer surface of said section 24, 26 also extend along an angle less than ninety degrees, and a median axial plane of these two further portions 65 intersects with the plane M.

According to the embodiment represented in a non-restrictive manner in FIG. 9, the two further portions 65 are diametrically opposed and a median axial plane (not shown) of these two further portions 65 is orthogonal to the plane P passing through the axes "A", "B" of the two pins 16, 18.

By way of alternative embodiment not shown, each guiding section 24, 26 could include further guiding portions. Each guiding section 24, 26 could thus include more than four guiding portions 64, 65.

To embody the portions 64, 65, each portion 64, 65 is for example defined by a pair of opposed flat sections 66 of axial orientation.

Figure 6:
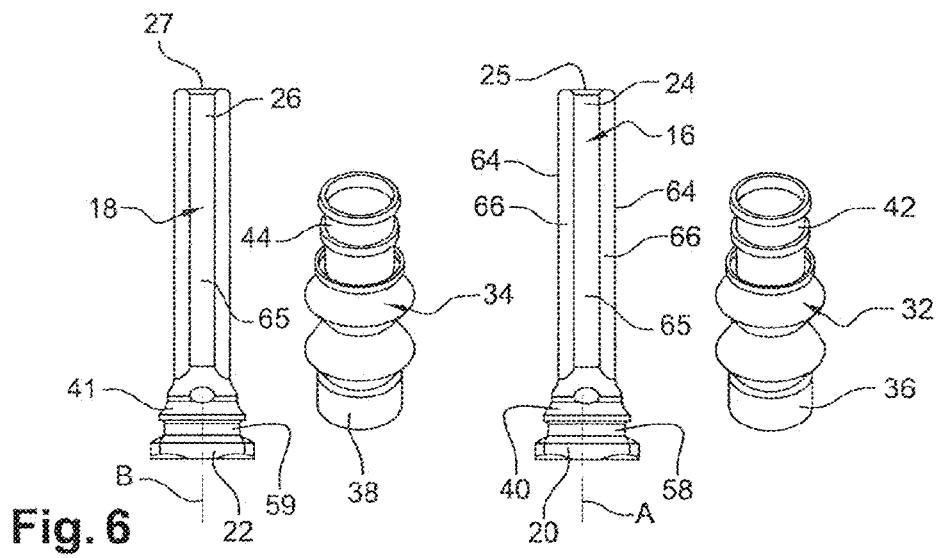
FIG. 6 is a side and perspective view on a larger scale of the two pins and the two sealing caps of the disc brake according to the invention in FIG. 5.

Each section 24, 26 of each pin 16, 18 is thus obtained herein from a section of cylindrical cross-section wherein two pairs of parallel and diametrically opposed flat sections 66 are formed, i.e. four flat sections 66 in pairs opposed and non-aligned along the transverse directions L and T, as shown in FIGS. 6 and 9.

In the preferred embodiment of the invention, each axial portion 64, 65 extends along the same axial length.

Each guiding section 24, 26 extends from a free end 25, 27 of the associated pin 16, 18.

As such, each guiding section offers a maximum length for the axial guiding of the caliper.

To enable the "decompression" of the air contained in the tiered bores 29 and 30, at least one flat section 66 of each pin 16, 18 extends from the free end 25, 27 of the pin along a length greater than that of the guiding section 24, 26.

Each associated tiered bore 29, 31 of the cover 12 includes, on the side of the end 20, 22 for attaching the pin 16, 18 to the caliper 10, a second so-called "entry" section 46, 48, and each pin 16, 18 receives a tubular cap 32, 34 an axial section whereof is inserted radially between the associated pin 16, 18 and the second entry section 46, 48.

The caps 32, 34 ensure the tightness of the tiered bores 29, 31 to dust.

Each cap 32, 34 includes an end 36, 38 which is fitted onto a collar 40, 41 of the end 20, 22 for attaching each pin 16, 18 and includes an opposite section 42, 44 which is inserted radially between each pin 16, 18 and the second entry section 46, 48 of the associated tiered bore 29, 31 of the cover 12.

To enable the decompression of the air contained in the tiered bores 29 and 30, the caps 32, 34 are associated with the flat sections 66 mentioned above by proposing, for each pin, a passage for air to the outside.

For this purpose, one wall of the internal bore 70 of each tubular cap 32, 34 includes at least one internal radial groove 72.

In this embodiment, the internal radial groove 72 "intersects" with the axial channels defined by the flat sections 66 and the walls of the bores 29, 31 and it enables, for this reason, the circulation of the air contained in the bore 29, 31 to the outside.

Figure 8:
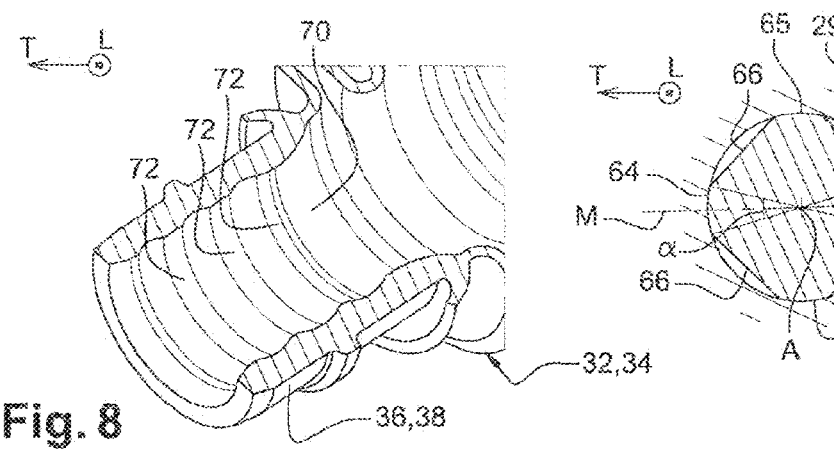
FIG. 8 is a perspective view, with partial cutaway, illustrating the internal axial bore of a cap for the disc brake according to the invention.

According to a first embodiment of the caps 32, 34 according to the invention, which is represented in FIG. 8, the inner wall 70 of each tubular cap 32, 34 includes a plurality of annular radial grooves 72 which are regularly spaced along the entire axial length of the cap 32.

Unlike the previous designs, the design according to the invention makes it possible advantageously to use two identical pins 16, 18, which makes it possible to reduce the production costs of such a brake.

The invention is not limited to the principle design described above. According to one conventional "mechanical inversion" in the field, the pins can be attached to the caliper and the associated bores can be formed in the cover.

Furthermore, whether the pins are attached to the caliper or to the cover, according to a further "mechanical inversion", the cylindrical guiding bearing surfaces for axial sliding of the pins may be circular cylindrical on the entire angular periphery and then the concave guiding surfaces of the associated bores have a design according to the invention consisting of at least one pair of opposed portions oriented and situated in the plane P.

The invention claimed is:

1. A motor vehicle disc brake comprising:
    a cover (12) including two tiered bores of parallel axes, each tiered bore including at least one first section (28, 30);
    a caliper (10) slidably mounted axially with respect to the cover (12);
    two pins (16, 18) of parallel axes (A, B) extending in a first direction, each pin including i) an axial attachment end (20, 22) attached to the caliper (10) and ii) at least one sliding guiding section (24, 26) for axial sliding of the caliper (10) with respect to the cover (12) which is slidably mounted, with a radial clearance, in the at least one first section (28, 30) of a respective one of said tiered bores (29, 31) of the cover (12),
    wherein a cylindrical outer guiding surface of said at least one sliding guiding section (24, 26) of each pin (16, 18) includes at least two opposed axial portions (64), each opposed axial portion (64) extending angularly about the axis (A, B) of each pin (16, 18) according to an angle less than 90°,
    wherein a median axial plane (M) of the at least two opposed axial portions (64), extending in the first direction of the axes (A, B) of the two pins (16, 18), is parallel with a plane (P) passing through the axes (A, B) of both of the two pins (16, 18) and extending in the first direction of the axes (A, B) of the two pins (16, 18), and
    wherein the at least two opposed axial portions (64) are diametrically opposed.

2. The disc brake according to claim 1, wherein each sliding guiding section (24, 26) extends from a free end (25, 27) of the associated pin (16, 18).

3. The disc brake according to claim 1, wherein the two pins (16, 18) are identical.

4. The disc brake according to claim 1, wherein each associated tiered bore (26, 31) of the cover (12) includes, on the side of the end (20, 22) for attaching the pin (16, 18) to the caliper, a second entry section (46, 48), each pin (16, 18) receives a tubular sealing cap (32, 34) wherein one section (42, 44) is inserted radially between the associated pin (16, 18) and said second entry section (46, 48).

5. A motor vehicle disc brake comprising:
    a cover (12) including two tiered bores of parallel axes, each tiered bore including at least one first section (28, 30);
    a caliper (10) slidably mounted axially with respect to the cover (12);
    two pins (16, 18) of parallel axes (A, B) extending in a first direction, each pin including i) an axial attachment end (20, 22) attached to the caliper (10) and ii) at least one sliding guiding section (24, 26) for axial sliding of the caliper (10) with respect to the cover (12) which is slidably mounted, with a radial clearance, in the at least one first section (28, 30) of a respective one of said tiered bores (29, 31) of the cover (12),
    wherein a cylindrical outer guiding surface of said at least one sliding guiding section (24, 26) of each pin (16, 18) includes at least two opposed axial portions (64), each opposed axial portion (64) extending angularly about the axis (A, B) of each pin (16, 18) according to an angle less than 90°, and
    wherein a median axial plane (M) of the at least two opposed axial portions (64), extending in the first direction of the axes (A, B) of the two pins (16, 18), is parallel with a plane (P) passing through the axes (A, B) of both of the two pins (16, 18) and extending in the first direction of the axes (A, B) of the two pins (16, 18), wherein the radial clearance, in said plane (M) parallel with the plane (P) passing through the axes (A, B) of the two pins (16, 18), of each sliding guiding section (24, 26) in the at least one first section (28, 30) of the associated tiered bore (29, 31) is equal to a common mean values.

6. The disc brake according to claim 5, wherein each sliding guiding section (24, 26) of each pin (16, 18) includes at least two further opposed axial portions (65) of the cylindrical outer surface of said sliding guiding section (24, 26).

7. The disc brake according to claim 6, wherein each opposed axial portion (64) and each said further opposed axial portion (65) is defined by a pair of flat sections (66) of axial orientation.

8. The disc brake according to claim 6, wherein each opposed axial portion (64) and each said further opposed axial portion (65) extends along the same axial length.

9. The disc brake according to claim 5, wherein at least one flat section (66) of each pin extends from a free end (25, 27) of the pin along a length greater than a length of the sliding guiding section (24, 26).

10. The disc brake according to claim 1, wherein each opposed axial portion (64) extends along the same axial length.

11. The disc brake according to claim 1, wherein each sliding guiding section (24, 26) extends from a free end (25, 27) of the associated pin (16, 18).

12. A motor vehicle disc brake comprising:
- a cover (12) including two tiered bores of parallel axes, each tiered bore including at least one first section (28, 30);
- a caliper (10) slidably mounted axially with respect to the cover (12);
- two pins (16, 18) of parallel axes (A, B) extending in a first direction, each pin including i) an axial attachment end (20, 22) attached to the caliper (10) and ii) at least one sliding guiding section (24, 26) for axial sliding of the caliper (10) with respect to the cover (12) which is slidably mounted, with a radial clearance, in the at least one first section (28, 30) of a respective one of said tiered bores (29, 31) of the cover (12), wherein a cylindrical outer guiding surface of said at least one sliding guiding section (24, 26) of each pin (16, 18) includes at least two opposed axial portions (64), each opposed axial portion (64) extending angularly about the axis (A, B) of each pin (16, 18) according to an angle less than 90°, wherein a median axial plane (M) of the at least two opposed axial portions (64), extending in the first direction of the axes (A, B) of the two pins (16, 18), is parallel with a plane (P) passing through the axes (A, B) of both of the two pins (16, 18) and extending in the first direction of the axes (A, B) of the two pins (16, 18), wherein the at least two opposed axial portions (64) are diametrically opposed, and wherein each opposed axial portion (64) is defined by a pair of flat sections (66) of axial orientation.

* * * * *